United States Patent
Chou et al.

(10) Patent No.: US 10,931,743 B1
(45) Date of Patent: Feb. 23, 2021

(54) SYSTEMS AND METHODS FOR DYNAMICALLY GENERATING ROUTING TABLES FOR EDGE NODES IN LARGE-SCALE NETWORKING INFRASTRUCTURES

(71) Applicant: Facebook, Inc., Menlo Park, CA (US)

(72) Inventors: David Shu-Hao Chou, Menlo Park, CA (US); Tianyin Xu, Urbana, IL (US); Kaushik Veeraraghavan, Bainbridge Island, WA (US); Andrew John Newell, Fremont, CA (US); Sonia Margulis, Mountain View, CA (US); Lin Xiao, Redwood City, CA (US); Pol Mauri Ruiz, Mountain View, CA (US); Justin James Meza, San Jose, CA (US); Kiryong Ha, Redmond, WA (US); Shruti Padmanabha, San Fransico, CA (US); Kevin Burton Cole, Menlo Park, CA (US); Dmitri Perelman, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/806,975

(22) Filed: Mar. 2, 2020

Related U.S. Application Data

(60) Provisional application No. 62/869,533, filed on Jul. 1, 2019.

(51) Int. Cl.
*H04L 29/08* (2006.01)
*H04L 12/26* (2006.01)
(Continued)

(52) U.S. Cl.
CPC ........ *H04L 67/1002* (2013.01); *H04L 41/145* (2013.01); *H04L 43/08* (2013.01); *H04L 45/745* (2013.01)

(58) Field of Classification Search
CPC ... H04L 67/1002; H04L 41/145; H04L 43/08; H04L 45/74
See application file for complete search history.

(56) References Cited

U.S. PATENT DOCUMENTS

| | | | |
|---|---|---|---|
| 6,434,664 B1 * | 8/2002 | Buch ................. | G06F 3/0611 711/112 |
| 7,324,555 B1 * | 1/2008 | Chen ................. | H04N 7/17336 348/E5.008 |

(Continued)

OTHER PUBLICATIONS

"Azure Front Door Service Documentation", URL: https://docs.microsoft.com/en-us/azure/frontdood/, Updated URL: https://github.com/MicrosoftDocs/azure-docs/tree/10f930f4157d9d9238b7ca1fd9a8871cbe518ffd/articles/frontdoor, revised on Jun. 1, 2019, 2 pages.

(Continued)

*Primary Examiner* — Arvin Eskandarnia
(74) *Attorney, Agent, or Firm* — FisherBroyles, LLP

(57) ABSTRACT

A disclosed computer-implemented method may include receiving, via a monitoring infrastructure that monitors an operational state of a networking infrastructure, data representative of the operational state of the networking infrastructure during a period of time. The networking infrastructure may include (1) a plurality of data centers, and (2) at least one point-of-presence (POP) edge node. The method may also include (1) accessing data representative of a set of predefined policies associated with the networking infrastructure, and (2) based on the data representative of the operational state (a) determining a set of edge load factors associated with the edge node, and (b) generating, via a linear solver and further based the set of edge load factors associated with the edge node and the set of predefined policies associated with the networking infrastructure, a (Continued)

routing table for the POP edge node. Various other methods, systems, and computer-readable media are also disclosed.

20 Claims, 5 Drawing Sheets

(51) Int. Cl.
    *H04L 12/24*     (2006.01)
    *H04L 12/741*     (2013.01)

(56) References Cited

U.S. PATENT DOCUMENTS

| | | | | |
|---|---|---|---|---|
| 7,797,064 B2* | 9/2010 | Loomis | ............... | G11B 20/10 700/94 |
| 10,700,964 B1* | 6/2020 | Yuan | ............... | H04L 43/0864 |
| 2004/0138948 A1* | 7/2004 | Loomis | ............... | H04H 60/82 700/94 |
| 2006/0206635 A1* | 9/2006 | Alexander | ............... | G06F 13/28 710/22 |
| 2007/0121526 A1* | 5/2007 | Sung | ............... | H04L 65/4061 370/252 |
| 2009/0183216 A1* | 7/2009 | Crosby | ............... | H04N 21/2343 725/105 |
| 2009/0288104 A1* | 11/2009 | Bagepalli | ............... | H04L 67/2819 719/328 |
| 2009/0313300 A1* | 12/2009 | Dettori | ............... | G06F 9/542 |
| 2012/0173754 A1* | 7/2012 | Dalrymple | ............... | H04L 65/1096 709/231 |
| 2016/0261493 A1* | 9/2016 | Li | ............... | H04L 43/50 |
| 2019/0280979 A1* | 9/2019 | Jain | ............... | H04L 12/56 |

OTHER PUBLICATIONS

Adya et al., "Slicer: Auto-Sharding for Datacenter Applications", Proceedings of the 12th USENIX Symposium on Operating Systems Design and Implementation (OSDI), Nov. 2-4, 2016, 17 pages.
Annamalai et al., "Sharding the Shards: Managing Datastore Locality at Scale with Akkio", Proceedings of the 13th USENIX Symposium on Operating Systems Design and Implementation (OSDI), Oct. 8-10, 2018, 17 pages.
Araujo et al., "Balancing on the Edge: Transport Affinity without Network State", Proceedings of the 15th USENIX Symposium on Networked Systems Design and Implementation (NSDI), Apr. 9-11, 2018, 15 pages.
Bethea et al., "Managing Load", The Site Reliability Workbook: Practical Ways to Implement SRE, Chapter 11, O'Reilly Media Inc, Aug. 2018, 14 pages.
Cherkasova et al., "Session Based Admission Control: A Mechanism for Improving the Performance of an Overloaded Web Server", Tech. Rep. HPL-98-119, Hewlett-Packard Company, Jun. 1998, pp. 1-40.
Cuervo, Alejandro Forero, "Handling Overload", URL: https://landing.google.com/sre/sre-book/chapters/handling-overload/, Site Reliability Engineering: How Google Runs Production Systems, Chapter 21, O'Reilly Media Inc., Apr. 2016, 9 pages.
Cuervo, Alejandro Forero, "Load Balancing in the Datacenter", URL: https://landing.google.com/sre/sre-book/chapters/load-balancing-datacenter/, Site Reliability Engineering: How Google Runs Production Systems, Chapter 20, O'Reilly Media Inc., Apr. 2016, 11 pages.
Eisenbud et al., "Maglev: A Fast and Reliable Software Network Load Balancer", Proceedings of the 13th USENIX Symposium on Networked Systems Design and Implementation (NSDI), Mar. 16-18, 2016, 14 pages.
Flavel et al., "FastRoute: A Scalable Load-Aware Anycast Routing Architecture for Modern CDNs", Proceedings of the 12th USENIX Symposium on Networked Systems Design and Implementation (NSDI), May 4-6, 2015, 15 pages.
Ford et al., "Availability in Globally Distributed Storage Systems", Proceedings of the 9th USENIX Conference on Operating Systems Design and Implementation (OSDI), Oct. 2010, pp. 1-14.
Gandhi et al., "Rubik: Unlocking the Power of Locality and End-point Flexibility in Cloud Scale Load Balancing", Proceedings of the 2015 USENIX Annual Technical Conference (USENIX ATC), Jul. 8-10, 2015, 13 pages.
Gandhi et al., "A Highly Available Layer-7 Load Balancer", Proceedings of the 11th European Conference on Computer Systems (EuroSys), Article No. 21, Apr. 2016, 4 pages.
Gandhi et al., "Duet: Cloud Scale Load Balancing with Hardware and Software", Proceedings of the 2014 ACM SIGCOMM Conference (SIGCOMM), Aug. 17-22, 2014, 12 pages.
Ganjam et al., "C3: Internet-Scale Control Plane for Video Quality Optimization", Proceedings of the 12th USENIX Symposium on Networked Systems Design and Implementation (NSDI), May 4-6, 2015, 15 pages.
Goldenberg et al., "Optimizing Cost and Performance for Multihoming", Proceedings of the ACM SIGCOMM Conference (SIGCOMM), Aug. 3-Sep. 3, 2004, 14 pages.
Govindan et al., "Evolve or Die: High-Availability Design Principles Drawn from Googles Network Infrastructure", Proceedings of the 2016 ACM SIGCOMM Conference (SIGCOMM), Aug. 22-26, 2016, 15 pages.
Gunawi et al., "What Bugs Live in the Cloud? A Study of 3000+ Issues in Cloud Systems", Proceedings of the 5th ACM Symposium on Cloud Computing (SoCC), Nov. 3-5, 2014, pp. 1-14.
Gunawi et al., "Why Does the Cloud Stop Computing? Lessons from Hundreds of Service Outages", Proceedings of the 7th ACM Symposium on Cloud Computing (SoCC), Oct. 5-7, 2016, pp. 1-16.
Gunawi et al., "Fail-Slow at Scale: Evidence of Hardware Performance Faults in Large Production Systems",Proceedings of the 16th USENIX Conference on File and Storage Technologies (FAST), Feb. 12-15, 2018, 15 pages.
Hong et al., "Achieving High Utilization with Software-driven WAN", Proceedings of the 2013 ACM SIGCOMM Conference (SIGCOMM), Aug. 12-16, 2013, pp. 15-26.
Hong et al., "B4 and After: Managing Hierarchy, Partitioning, and Asymmetry for Availability and Scale in Google's Software-defined WAN", Proceedings of the ACM SIGCOMM Conference (SIGCOMM), Aug. 20-25, 2018, pp. 74-87.
Hunt et al., "ZooKeeper: Wait-free Coordination for Internet-scale Systems", Proceedings of the USENIX Conference on USENIX Annual Technical Conference (USENIX ATC), Jun. 2010, pp. 1-14.
Jain et al., "B4: Experience with a Globally-deployed Software Defined WAN", Proceedings of the ACM SIGCOMM Conference (SIGCOMM), Aug. 12-16, 2013, 12 pages.
Jiang et al., "Cooperative Content Distribution and Traffic Engineering in an ISP Network", Proceedings of the 11th International Joint Conference on Measurement and Modeling of Computer Systems (SIGMETRICS), Jun. 15-19, 2009, pp. 1-12.
Jimenez et al., "Building Express Backbone: Facebook's new long-haul networks", URL: https://code.fb.com/data-center-engineering/building-express-backbone-facebook-s-new-long-haul-network/, Data Center Engineering, Networking & Traffic, May 1, 2017, 7 pages.
Julienne, Theo, "GLB: GitHub's open source load balancer", URL: https://githubengineering.com/glb-director-open-source-load-balancer/, Aug. 8, 2018, 16 pages.
Kabiljo et al., "Social Hash Partitioner: a Scalable Distributed Hypergraph Partitioner", Journal Proceedings of the VLDB Endowment, vol. 10, No. 11, Aug. 2017, pp. 1418-1429.
Kang et al., "Efficient Traffic Splitting on Commodity Switches", Proceedings of the 11th ACM Conference on Emerging Networking Experiments and Technologies (CoNEXT), Dec. 1-4, 2015, 13 pages.
Keeton et al., "Designing for Disasters", Proceedings of the 3rd USENIX Conference on File and Storage Technologies (FAST), Mar 31-Apr. 2, 2004, 15 pages.
Khalidi, Yousef, "How Microsoft builds its fast and reliable global network", URL: https://azure.microsoft.com/en-us/blog/how-microsoft-builds-its-fast-and-reliable-global-network/, Mar. 2017, 9 pages.
Krishnan, Kripa, "Weathering the Unexpected", Communications of the ACM (CACM) vol. 55, No. 11, Nov. 2012, pp. 48-52.

(56) References Cited

OTHER PUBLICATIONS

Lewandowski, Piotr, "Load Balancing at the Frontend", URL: https://landing.google.com/sre/sre-book/chapters/load-balancing-frontend/, Site Reliability Engineering: How Google Runs Production Systems, Chapter 19, O'Reilly Media Inc., Apr. 2016, 5 pages.

Liu et al., "Efficiently Delivering Online Services over Integrated Infrastructure", Proceedings of the 13th USENIX Symposium on Networked Systems Design and Implementation (NSDI), Mar. 16-18, 2016, 15 pages.

Liu et al., "Optimizing Cost and Performance for Content Multihoming", Proceedings of the ACM SIGCOMM Conference (SIGCOMM), Aug. 13-17, 2012, pp. 371-382.

Lupi, Robeto, "Monarch, Google's Planet Scale Monitoring Infrastructure", URL: https://www.youtube.com/watch?v=LlvJdK1xsl4, Dec. 12, 2016, 1 page.

Mallapur, Anil, "TrafricShift: Load Testing at Scale", URL: https://engineering.linkedin.com/blog/2017/05/trafficshift—load-testing-at-scale, May 11, 2017, 4 pages.

Maurer, Ben, "Fail at Scale: Reliability in the Face of Rapid Change", Communications of the ACM (CACM), vol. 58, No. 11, Nov. 2015, pp. 1-17.

Miao et al., "SilkRoad: Making Stateful Layer-4 Load Balancing Fast and Cheap Using Switching ASICs", Proceedings of the ACM SIGCOMM Conference (SIGCOMM), Aug. 21-25, 2017, pp. 15-28.

Michelsen, Martin, "Continuous deployment at Quora", URL: http://engineering.quora.com/Continuous-Deployment-at-Quora, Apr. 29, 2013, 4 pages.

Mogul et al., "Thinking about Availability in Large Service Infrastructures", Proceedings of the 16th Workshop on Hot Topics in Operating Systems (HotOS XVI), May 8-10, 2017, pp. 12-17.

Narayana et al., "To Coordinate or Not to Coordinate? Wide-Area Traffic Management for Data Centers", Tech. Rep. TR-998-15, Dec. 2012, pp. 1-19.

Olteanu et al., "Stateless Datacenter Load-balancing with Beamer", Proceedings of the 15th USENIX Symposium on Networked Systems Design and Implementation (NSDI), Apr. 9-11, 2018, 16 pages.

Oppenheimer et al., "Why Do Internet Services Fail, and What Can Be Done About It?", Proceedings of the 4th Conference on USENIX Symposium on Internet Technologies and Systems (USITS), Mar. 2003, 15 pages.

Patel et al., "Ananta: Cloud Scale Load Balancing", Proceedings of the ACM SIGCOMM Conference, Aug. 12-16, 2013, pp. 207-218.

Patterson et al., "Recovery-Oriented Computing (ROC): Motivation, Definition, Techniques, and Case Studies", Tech. Rep. UCB//CSD-02-1175, Mar. 2002, 16 pages.

Pelkonen et al., "Gorilla: A Fast, Scalable, In-Memory Time Series Database", Proceedings of the 41st International Conference on Very Large Data Bases (VLDB), Aug. 31-Sep. 4, 2015, pp. 1816-1827.

Ray, Shaun, "New—AWS Global Accelerator for Availability and Performance", URL: https://aws.amazon.com/global-accelerator/, Nov. 26, 2018, 6 pages.

Rossi et al., "Continuous Deployment of Mobile Software at Facebook (Showcase)", Proceedings of the 24th ACM SIGSOFT International Symposium on Foundations of Software Engineering (FSE), Nov. 13-18, 2016, pp. 12-23.

Schlinker et al., "Engineering Egress with Edge Fabric: Steering Oceans of Content to the World", Proceedings of the ACM SIGCOMM Conference (SIGCOMM), Aug. 21-25, 2017, 14 pages.

Shalita et al., "Social Hash: An Assignment Framework for Optimizing Distributed Systems Operations on Social Networks", Proceedings of the 13th USENIX Symposium on Networked Systems Design and Implementation (NSDI), Mar. 16-18, 2016, 15 pages.

Sherman et al. "ACMS: The Akamai Configuration Management System", Proceedings of the 2nd Conference on Symposium on Networked Systems Design and Implementation (NSDI), May 2005, 14 pages.

Sommermann et al., "Introducing Proxygen, Facebook's C++ HTTP framework", URL: https://code.facebook.com/posts/1503205539947302, Networking & Traffic, Production Engineering, Nov. 5, 2014, 5 pages.

Tang et al., "Holistic Configuration Management at Facebook", Proceedings of the 25th Symposium on Operating Systems Principles (SOSP), Oct. 4-7, 2015, pp. 328-343.

Savor et al., "Continuous Deployment at Facebook and OANDA", Proceedings of the 38th IEEE/ACM International Conference on Software Engineering Companion (ICSE), May 14-22, 2016, pp. 21-30.

Treynor et al., "The Calculus of Service Availability", Communications of the ACM (CACM), vol. 60, No. 9, Sep. 2017, pp. 42-47.

Veeraraghavan et al., "Kraken: Leveraging Live Traffic Tests to Identify and Resolve Resource Utilization Bottlenecks in Large Scale Web Services", Proceedings of the 12th USENIX Symposium on Operating Systems Design and Implementation (OSDI), Nov. 2-4, 2016, 19 pages.

Veeraraghavan et al., "Maelstrom: Mitigating Datacenter-level Disasters by Draining Interdependent Traffic Safely and Efficiently", Proceedings of the 13th USENIX Symposium on Operating Systems Design and Implementation (OSDI), Oct. 8-10, 2018, 18 pages.

Welsh et al., "Adaptive Overload Control for Busy Internet Servers", Proceedings of the 4th Conference on USENIX Symposium on Internet Technologies and Systems (USITS), Mar. 2003, 14 pages.

Wendell et al., "Donar: Decentralized Server Selection for Cloud Services", Proceedings of the ACM SIGCOMM Conference (SIGCOMM), Aug. 30-Sep. 3, 2010, 12 pages.

Xu et al., "Joint Request Mapping and Response Routing for Geo-distributed Cloud Services", Proceedings of the 32nd IEEE International Conference on Computer Communications (INFOCOM), Apr. 2013, 9 pages.

Yap et al., "Taking the Edge off with Espresso: Scale, Reliability and Programmability for Global Internet Peering", Proceedings of the 2017 ACM SIGCOMM Conference (SIGCOMM), Aug. 21-25, 2017, pp. 432-445.

Zhang et al., "Optimizing Cost and Performance in Online Service Provider Networks", Proceedings of the 7th USENIX Symposium on Networked Systems Design and Implementation (NSDI), Apr. 2010, pp. 1-15.

Zhou et al., "Overload Control for Scaling WeChat Microservices", Proceedings of the ACM Symposium on Cloud Computing (SoCC), Oct. 11-13, 2018, 13 pages.

* cited by examiner

SYSTEMS AND METHODS FOR DYNAMICALLY GENERATING ROUTING TABLES FOR EDGE NODES IN LARGE-SCALE NETWORKING INFRASTRUCTURES

CROSS REFERENCE TO RELATED APPLICATION

This application claims the benefit of U.S. Provisional Patent Application No. 62/869,533, filed Jul. 1, 2019, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
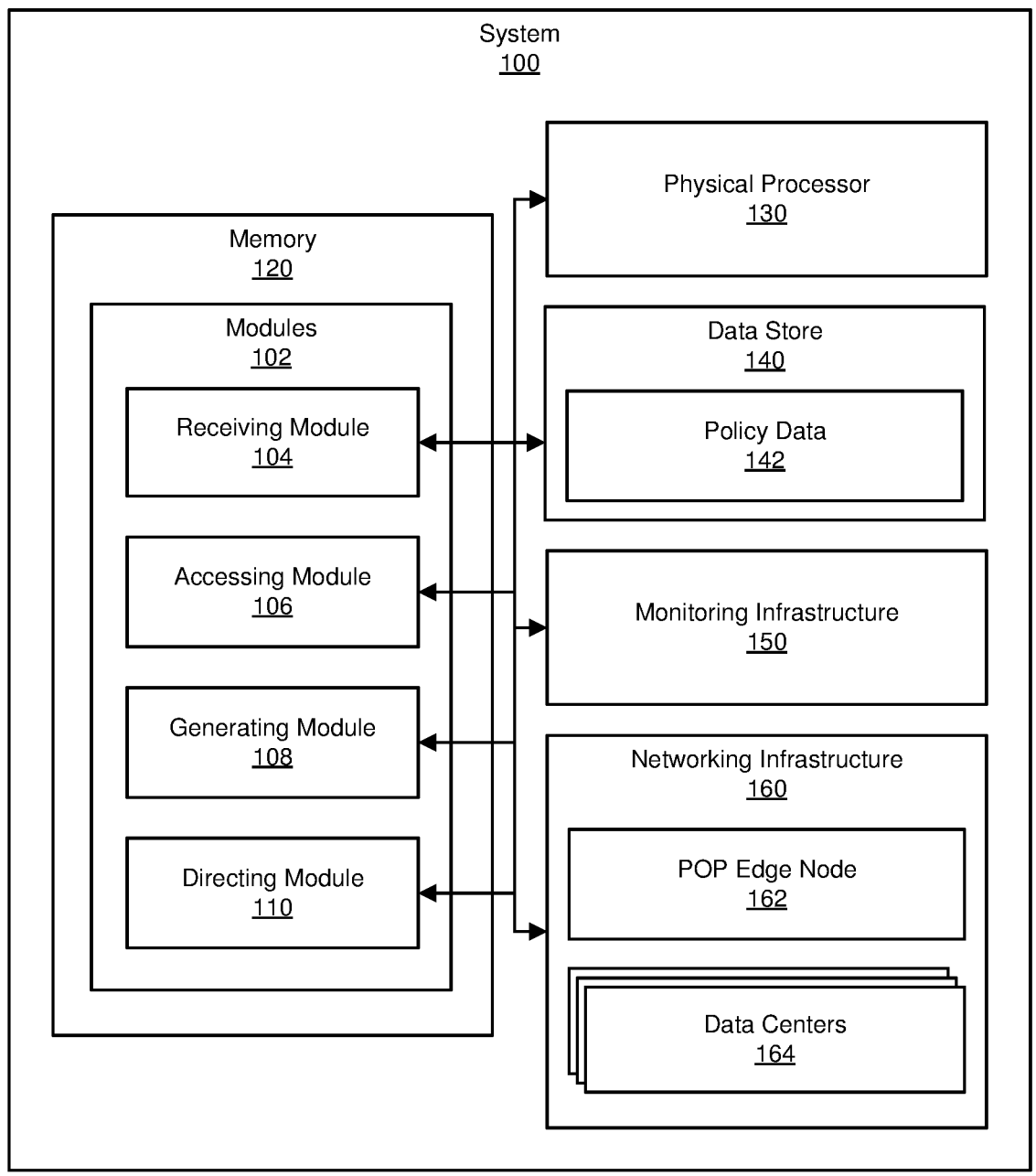
FIG. 1 is a block diagram of an example system for dynamically generating a routing table for an edge node in a large-scale networking infrastructure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Modern Internet services may operate on a bipartite architecture with one or more data centers interconnecting one or more edge nodes, also known as points of presence (POP). Data centers may host a majority of computing and storage capacity of most Internet services. Edge nodes may be much smaller in size (e.g., computing resources, storage capacity, physical dimensions, etc.) and may be physically or logically located closer to end users.

Edge nodes may cache and/or distribute static content such as image and/or video data. In case of a miss in an edge node (i.e., the edge node is unable to fulfill a user request for static content), static content may be fetched from data centers via wide area network (WAN) traffic engineering solutions. User requests for dynamic content, such as real-time messages and search queries, may be a significant source of network traffic from edge nodes to data centers. It may be a common practice for major Internet services to build private backbone networks or peering links that connect edge nodes to data centers to avoid unpredictable performance and congestion on public WANs.

Conventional routing solutions may include a static mapping to route user requests from edge nodes to data centers. Unfortunately, such static mappings may become increasingly difficult to maintain as a particular Internet service expands to a global scale. For example, if a service's popularity and capacity needs outpace capacity availability, the service provider may be unable to service all user requests. Concurrently, some locales may experience fast or explosive growth, whereas other locales may experience slower growth. A static edge-to-datacenter mapping may result in a capacity shortage in data centers serving some edges and over-provisioned capacity in other data centers. This imbalance may result in load shedding or failures during peak load times.

Additionally, as a service provider's products evolve, the nature of user requests may change. For example, some products may provide an interactive experience that may require or be optimized for a "sticky" routing between a user's device and the service provider's data centers. This stickiness may reduce the effectiveness of a static mapping to manage user traffic.

Furthermore, the underlying physical infrastructure of an architecture may constantly evolve as server generations may be updated, capacity may be added or removed, and networking infrastructure may be improved. A static mapping may be insufficiently flexible and unable to adapt to such infrastructure evolution. Moreover, as an infrastructure footprint grows, inevitable network failures, power loss, software misconfiguration, and other possible causes may result in some fraction of the edge and data center capacity becoming unavailable. A static edge-to-data-center routing strategy may be rigid and susceptible to failures when such operational issues may arise. Hence, the present disclosure identifies and addresses a need for new and improved methods of dynamically routing data in large-scale heterogeneous networks.

The present disclosure is generally directed to systems and methods for dynamically routing data in large-scale networks. In some examples, the systems and methods described herein may be directed to dynamically generating a routing table. As will be explained in greater detail below, an example system may receive, via a monitoring infrastructure that monitors an operational state of a networking infrastructure, data representative of the operational state of the networking infrastructure during a period of time. The networking infrastructure may include a plurality of data centers and at least one point-of-presence (POP) edge node. The example system may also access data representative of a set of predefined policies associated with the networking infrastructure. As an example, the set of predefined policies may include a constraint to equally balance a utilization of a set of data centers included in the networking infrastructure. In additional examples, the set of predefined policies may include a constraint to optimize edge-to-data center latency for each POP edge node included in the networking infrastructure.

The example system may also determine, for each POP edge node for each POP edge node in the set of POP edge nodes, based on the data representative of the operational state of the networking infrastructure during the period of time, a set of edge load factors associated with the edge node. For example, the set of edge load factors associated with the edge node may include requests-per-second for stateless traffic and/or user sessions for sticky traffic. The example system may further generate, for each POP edge node for each POP edge node in the set of POP edge nodes, via a linear solver and further based the set of edge load factors associated with the edge node and the set of predefined policies associated with the networking infrastructure, a routing table for the POP edge node. An example system may also incorporate safety guards that may limit a volume of traffic change permitted in each generated routing table.

As will be described in greater detail below, the systems and methods described herein may model user traffic within a networking infrastructure as an assignment problem—assigning traffic objects at POP edge nodes of the networking infrastructure to data centers within the networking infrastructure to satisfy service-level objectives. Embodiments of the systems and methods described herein may solve this assignment problem via constraint optimization solvers, which may efficiently determine a beneficial routing path for user traffic within the networking infrastructure. Furthermore, the systems and methods described herein may continuously adjust a routing table of a POP edge node to accommodate dynamics of user traffic and failure events that may reduce capacity within the networking infrastructure. The systems and methods described herein may further provide for a more efficient usage of telecommunications resources (e.g., bandwidth) than traditional or conventional data routing methods by effectively balancing data center utilization, minimizing latency, and efficiently utilizing a capacity of the networking infrastructure.

The following will provide, with reference to FIGS. 1-2 and 4-5, detailed descriptions of systems for dynamically generating a routing table for an edge node in a large-scale networking infrastructure. Detailed descriptions of corresponding computer-implemented methods will also be provided in connection with FIG. 3.

FIG. 1 is a block diagram of an example system 100 for dynamically generating a routing table for an edge node in a large-scale networking infrastructure. As illustrated in this figure, example system 100 may include one or more modules 102 for performing one or more tasks. As will be explained in greater detail below, modules 102 may include a receiving module 104 that may receive, via a monitoring infrastructure that monitors an operational state of a networking infrastructure, data representative of the operational state of the networking infrastructure during a period of time, the networking infrastructure including (1) a plurality of data centers, and (2) at least one POP edge node. Example system 100 and/or modules 102 may also include an accessing module 106 that may access data representative of a set of predefined policies associated with the networking infrastructure.

As also shown in FIG. 1, example system 100 may also include a generating module 108 that may, based on the data representative of the operational state of the networking infrastructure during the period of time (a) determine a set of data center load factors, each data center load factor in the set of data center load factors associated with a different data center in the plurality of data centers, and (b) generate, via a linear solver and further based the set of data center load factors and the set of predefined policies associated with the networking infrastructure, a routing table for the POP edge node. In some embodiments, example system 100 may also include a directing module 110 that may direct the POP edge node to (1) receive a user request from a user device, and (2) route, in accordance with the routing table, the user request from the POP edge node to a data center in the plurality of data centers As further illustrated in FIG. 1, example system 100 may also include one or more memory devices, such as memory 120. Memory 120 generally represents any type or form of volatile or non-volatile storage device or medium capable of storing data and/or computer-readable instructions. In one example, memory 120 may store, load, and/or maintain one or more of modules 102. Examples of memory 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As further illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 120. Additionally or alternatively, physical processor 130 may execute one or more of modules 102 to facilitate dynamically generating a routing table for an edge node in a large-scale networking infrastructure. Examples of physical processor 130 include, without limitation, microprocessors, microcontrollers, central processing units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As also shown in FIG. 1, example system 100 may also include one or more data stores, such as data store 140, that may receive, store, maintain, and/or otherwise interact with data. Data store 140 may represent portions of a single data store or computing device or a plurality of data stores or computing devices. In some embodiments, data store 140 may be a logical container for data and may be implemented in various forms (e.g., a database, a file, a file system, a data structure, etc.). Examples of data store 140 may include, without limitation, files, file systems, data stores, databases, and/or database management systems such as an operational data store (ODS), a relational database, a NoSQL database, a NewSQL database, and/or any other suitable organized collection of data.

In at least one example, data store 140 may include (e.g., store, host, access, maintain, etc.) policy data 142. As will be explained in greater detail below, in some examples, policy data 142 may include information including, representative of, and/or associated with one or more policies, protocols, strategies, goals, directives, programs, constraints, systems of principles, etc. that may be applied to and/or implemented by a networking infrastructure (e.g., networking infrastructure 160) to accomplish one or more outcomes and/or objectives. In some examples, a policy may specify one or more constraints and/or one or more optimization objectives. For example, a policy may specify a constraint of equally balancing utilization of all available data centers while optimizing network latency. An additional or alternative policy may be a "closest data center policy" which an example system may model by optimizing edge-to-data-center latency with a constraint of not exceeding predefined utilization thresholds.

System 100 may also include a monitoring infrastructure 150 that may be associated with a networking infrastructure 160. Monitoring infrastructure 150 may monitor (e.g., gather data associated with) an operational state (e.g., capacity, health, utilization, etc.) of one or more POP edge nodes and/or a plurality of data centers included in networking infrastructure 160. Networking infrastructure 160 that may include at least one POP edge node 162 and a plurality of data centers 164. As will be described in greater detail below, a POP edge node (e.g., POP edge node 162) may include one or more computing devices that may act as an end user portal for communication with other nodes in a networking infrastructure (e.g., networking infrastructure 160). In some examples, POP edge nodes may function as reverse proxies for terminating user connections physically, geographically, and/or logically close to internet service providers (ISPs) that may provide internet service to users. In additional or alternative examples, POP edge nodes may cache and/or distribute static content such as images and/or video.

As will be described in greater detail below, a data center (e.g., one or more of data centers 164) may include a set of routers and/or switches that may transport traffic between one or more servers according to a data center network architecture. In general, as noted above, POP edge nodes may cache and/or distribute static content such as image and/or video data. In case of a miss in a POP edge node (i.e., the POP edge node is unable to fulfill a user request for static content), static content may be fetched from data centers via wide area network (WAN) traffic engineering solutions. User requests for dynamic content, such as real-time messages and search queries, may be a significant source of network traffic from POP edge nodes to data centers.

Figure 2:
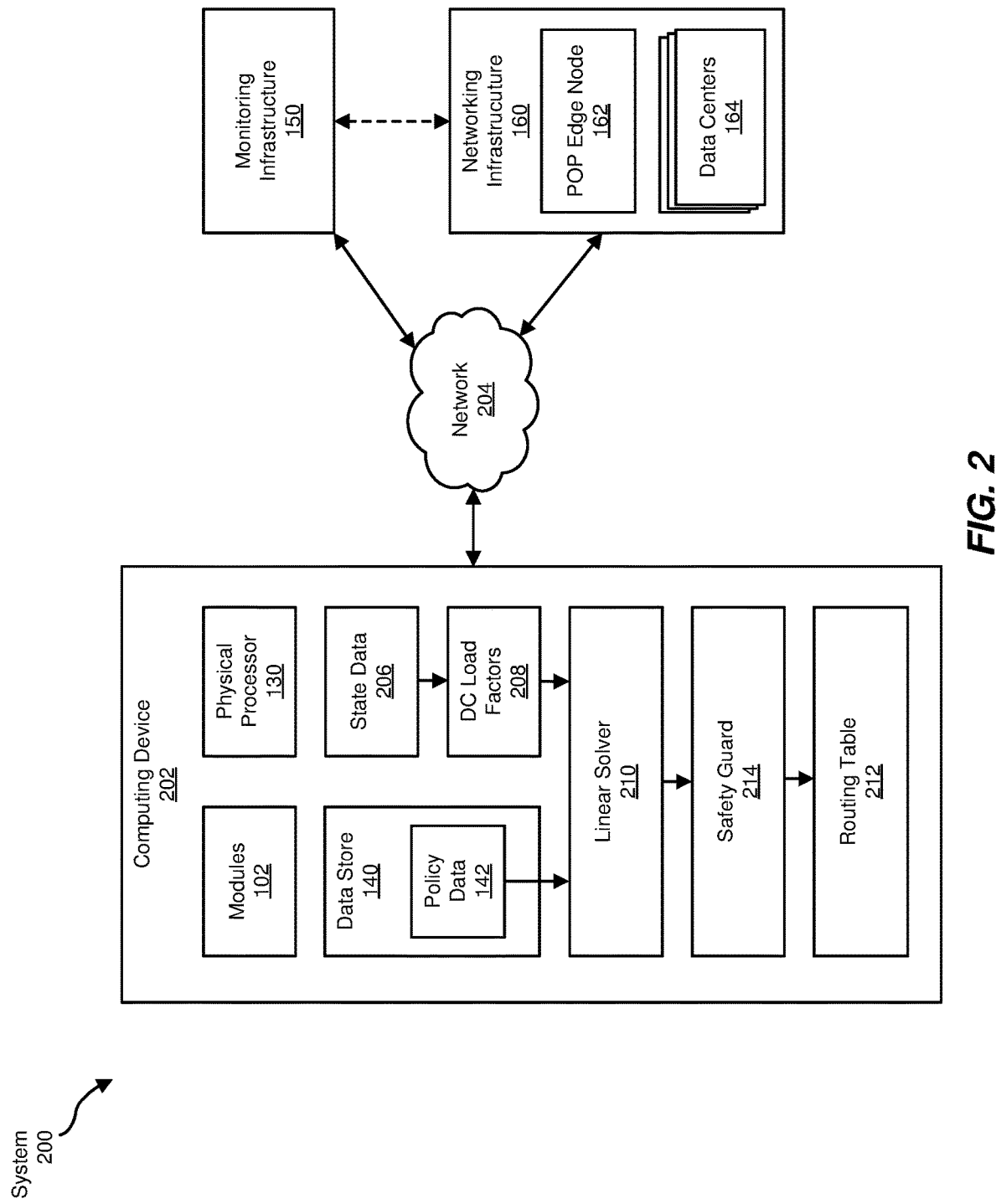
FIG. 2 is a block diagram of an example implementation of a system for dynamically generating a routing table for an edge node in a large-scale networking infrastructure.

Example system 100 in FIG. 1 may be implemented in a variety of ways. For example, all or a portion of example system 100 may represent portions of an example system 200 ("system 200") in FIG. 2. As shown in FIG. 2, system 200 may include a computing device 202 in communication with a monitoring infrastructure 150 and a networking infrastructure 160 via a network 204. In at least one example, computing device 202 may be programmed with one or more of modules 102.

In at least one embodiment, one or more modules 102 from FIG. 1 may, when executed by computing device 202, enable computing device 202 to perform one or more operations to dynamically generate a routing table for an edge node in a large-scale networking infrastructure. For example, as will be described in greater detail below, receiving module 104 may cause computing device 202 to receive, via a monitoring infrastructure (e.g., monitoring infrastructure 150) that monitors an operational state of a networking infrastructure (e.g., networking infrastructure 160), data representative of the operational state of the networking infrastructure during a period of time (e.g., state data 206). The networking infrastructure may include (1) a plurality of data centers (e.g., data centers 164), and (2) at least one POP edge node (e.g., POP edge node 162).

Furthermore, accessing module 106 may cause computing device 202 to access data representative of a set of predefined policies associated with the networking infrastructure (e.g., policy data 142). In some examples, generating module 108 may cause computing device 202 to determine, based on the data representative of the operational state of the networking infrastructure during the period of time, a set of data center load factors (e.g., data center load factors 208, also "load factors 208" in FIG. 2), each data center load factor in the set of data center load factors associated with a different data center in the plurality of data centers. Additionally, generating module 108 may cause computing device 202 to generate, based on the data representative of the operational state of the networking infrastructure during the period of time, via a linear solver (e.g., linear solver 210) and further based on the set of data center load factors and the set of predefined policies associated with the networking infrastructure, a routing table (e.g., routing table 212) for the POP edge node.

Furthermore, in some examples, generating module 108 may generate the routing table for the POP edge node by, for each data center in the plurality of data centers, limiting (e.g., via safety guard 214) a change in a volume of traffic routed from the POP edge node to the data center in accordance with a threshold volume difference. In some examples, directing module 110 may cause computing device 202 to direct the POP edge node to (1) receive a user request from a user device (e.g., user device 402 in FIG. 4), and route, in accordance with the routing table, the user request from the POP edge node to a data center in the plurality of data centers.

Computing device 202 generally represents any type or form of computing device capable of reading and/or executing computer-executable instructions. In at least one embodiment, computing device 202 may accept one or more directions from monitoring infrastructure 150 and/or networking infrastructure 160. Examples of computing device 202 include, without limitation, servers, desktops, laptops, tablets, cellular phones, (e.g., smartphones), personal digital assistants (PDAs), multimedia players, embedded systems, wearable devices (e.g., smart watches, smart glasses, etc.), gaming consoles, combinations of one or more of the same, or any other suitable mobile computing device.

Network 204 generally represents any medium or architecture capable of facilitating communication and/or data transfer between computing device 202, monitoring infrastructure 150, and/or networking infrastructure 160. Examples of network 204 include, without limitation, an intranet, a WAN, a LAN, a Personal Area Network (PAN), the Internet, Power Line Communications (PLC), a cellular network (e.g., a Global System for Mobile Communications (GSM) network, a code-division multiple access (CDMA) network, a Long-Term Evolution (LTE) network, etc.), universal serial bus (USB) connections, proprietary connections, and the like. Network 204 may facilitate communication or data transfer using wireless or wired connections. In one embodiment, network 204 may facilitate communication between computing device 202, monitoring infrastructure 150, and networking infrastructure 160.

In at least one example, computing device 202 may be one or more computing devices programmed with one or more of modules 102. All or a portion of the functionality of modules 102 may be performed by computing device 202 and/or any other suitable computing system. As will be described in greater detail below, one or more of modules 102 from FIG. 1 may, when executed by at least one processor of computing device 202, may enable computing device 202 to dynamically generate a routing table for an edge node in a large-scale networking infrastructure.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from those shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

Figure 3:
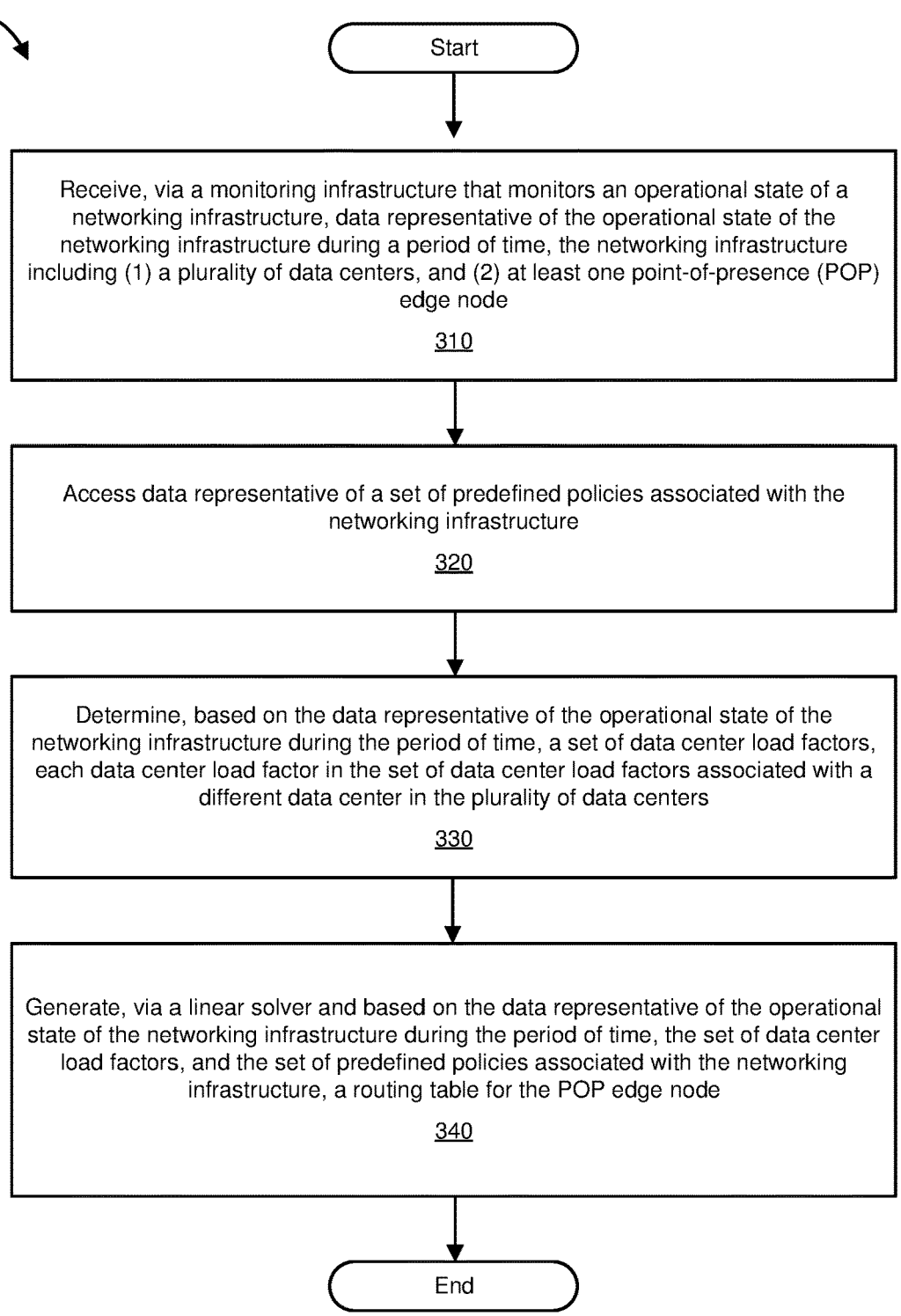
FIG. 3 is a flow diagram of an example method for dynamically generating a routing table for an edge node in a large-scale networking infrastructure.

FIG. 3 is a flow diagram of an example computer-implemented method 300 for allocating shared resources in multi-tenant environments. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310, one or more of the systems described herein may receive, via a monitoring infrastructure that monitors an operational state of a networking infrastructure, data representative of the operational state of the networking infrastructure during a period of time. For example, receiving module 104 may, as part of computing device 202 in FIG. 2, cause computing device 202 to receive, via monitoring infrastructure 150 that monitors an operational state of networking infrastructure 160, data representative of the operational state of networking infrastructure 160 during a period of time. Furthermore, as described above, networking infrastructure 160 may include at least one POP edge node and a plurality of data centers, such as POP edge node 162 and data centers 164.

In some examples, the period of time may include and/or represent any suitable duration or term of time during which a monitoring infrastructure (e.g., monitoring infrastructure 150) may observe and/or collect data associated with an operational state of a networking infrastructure. For example, monitoring infrastructure 150 may observe and/or collect data associated with an operational state of networking infrastructure 160 (e.g., an operational state of one or more of data centers 164, an operational state of one or more POP edge nodes such as POP edge node 162, and so forth) during a particular second, millisecond, microsecond, minute, hour, and so forth. In some examples, the period of time may be referred to as an "epoch" associated with one or more components of system 100, system 200, and so forth. Additionally, monitoring infrastructure 150 may observe and/or collect data associated with an operational state of networking infrastructure 160 periodically, over a plurality of periods of time. In this way, state data 206 may include time series data that may record and/or reflect a change in a particular metric over multiple periods of time or multiple epochs.

State data 206 may include and/or represent any suitable data associated with any suitable operational state of networking infrastructure 160. By way of example, state data 206 may include data associated with a capacity, health, and/or utilization of POP edge node 162 and/or one or more of data centers 164. Additionally or alternatively, state data 206 may include data associated with measurement data such as edge traffic volumes (e.g., volumes of traffic between POP edge node 162 and one or more of data centers 164) and/or an edge-to-data-center latency (e.g., latency between POP edge node 162 and one or more of data centers 164). Hence, in some examples, state data 206 may include a set a set of edge traffic volume metrics, wherein each edge traffic volume metric included in the set of edge traffic volume metrics is associated with a different data center in the plurality of data centers. Additionally or alternatively, state data 206 may include a set of latency metrics, wherein each latency metric included in the set of latency metrics is representative of a latency between the POP edge node and a different data center in the plurality of data centers.

In some embodiments, one or more of modules 102 (e.g., receiving module 104) may read, normalize, and/or aggregate state data 206. For example, for time series data, receiving module 104 may aggregate recent (e.g., temporally proximate) recent data points. This may decouple receiving of state data 206 and processing of state data 206 (e.g., by one or more of modules 102), enabling an isolated test environment that may consume data from historical snapshots or synthetic data in test scenarios.

Returning to FIG. 3, at step 320, one or more of the systems described herein may access data representative of a set of predefined policies associated with the networking infrastructure. For example, accessing module 106 may, as part of computing device 202, access policy data 142, from data store 140, that may include and/or represent data representative of a set of predefined policies associated with networking infrastructure 160.

As described above, in some examples, policy data 142 may include information including, representative of, and/or associated with one or more policies, protocols, strategies, goals, directives, programs, constraints, systems of principles, etc. that may be applied to and/or implemented by a networking infrastructure (e.g., networking infrastructure 160) to accomplish one or more outcomes and/or objectives. In some examples, a policy may specify one or more constraints and/or one or more optimization objectives.

Accessing module 106 may access policy data 142 in any suitable way. For example, accessing module 106 may access data stored in data store 140 and may identify policy data 142 that may be associated with networking infrastructure 160.

Returning to FIG. 3, at step 330, one or more of the systems described herein may determine, based on data representative of an operational state of a networking infrastructure during a period of time, a set of data center load factors, each data center load factor in the set of data center load factors associated with a different data center in the plurality of data centers. For example, generating module 108 may, as part of computing device 202 in FIG. 2, determine, based on state data 206, set of data center load factors 208, each data center load factor in set of data center load factors 208 associated with a different data center in plurality of data centers 164.

In some examples, a "data center load factor" may include any data or factor representative of a load or utilization of a data center. In some examples, a utilization of a data center may include a measurement of how much traffic is or may be served by a particular service provided by the data center during a period of time. Utilization metrics may vary between services and may account for heterogeneity in hardware. For example, "sticky" services may measure a server's utilization based on a number of active sessions during the period of time. As another example, a stateless web service may use a normalized metric called an i-dyno score that may be based on the operations per second observed on a particular server. Monitoring infrastructure 150 and/or receiving module 104 may generate an i-dyno score for a stateless service using conventional performance benchmarks and/or by load testing different types of servers using live traffic. In some examples, one or more of modules 102 may assume that utilization for a service may increase proportionally to the load being served in an epoch. Monitoring infrastructure 150 and/or receiving module 104 may verify a utilization metric at the data center level by running regular load tests using live traffic. As will be described in greater detail below, one or more of modules 102 (e.g., receiving module 104, generating module 108, etc.) may reevaluate traffic allocation decisions in every epoch by reading current utilization directly from monitoring infrastructure 150.

Embodiments of the systems and methods described herein (e.g., generating module 108) may model traffic load as requests-per-second (RPS) for stateless traffic and as user sessions for sticky traffic. The model may allow stateless traffic to be routed to any available data center while constraining sticky traffic to the same machine so as to not disrupt established sessions.

Returning to FIG. 3, at step 340, one or more of the systems described herein may generate, via a linear solver and based on the data representative of the operational state of the networking infrastructure during the period of time, the set of data center load factors, and the set of predefined policies associated with the networking infrastructure, a routing table for the POP edge node.

In some examples, a "routing table" may include any data that may express or represent a relationship between data received by a POP edge node 162 and a data center 164. For example, a routing table may include data representative of a fraction of user traffic received by POP edge node 162 that POP edge node 162 may route to a data center included in data centers 164. In some examples, such a routing table may be expressed as a simple collection of tuples of the form {edge:{datacenter:fraction}}.

In some examples, a "linear solver" may include any software or hardware system that may be configured to solve a linear equation or function. In some examples, a "linear equation" or "linear function" may include a constraint satisfaction problem (CSP) or a constraint optimization problem (COP). In general, a CSP may be a mathematical question defined as a set of objects whose state must satisfy a number of constraints or limitations. CSPs may represent entities in a problem as a homogeneous collection of finite constraints over variables, which may be solved by constraint satisfaction methods.

A formal definition for a CSP may include a triple $\langle X, D, C \rangle$, where $X=\{X_1, \ldots X_n\}$ may be a set of variables, $D=\{D_1, \ldots D_n\}$ may be a set of respective domain values, and $C=\{C_1, \ldots C_n\}$ is a set of constraints. Each variable $X_i$ may take on the values in the nonempty domain $D_i$. Every constraint $C_j \in C$ may in turn be a pair $\langle t_j, R_1 \rangle$, where $t_j \subset X$ is a subset of k variables and $R_j$ is a k-any relation on the corresponding subset of domains $D_j$. An "evaluation" of the variables is a function from a subset of variables to a particular set of values in the corresponding subset of domains. An evaluation v satisfies a constraint $\langle t_j, R_1 \rangle$ if the values assigned to the variables $t_j$ satisfies the relation $R_j$.

An evaluation may be "consistent" if it does not violate any of the constraints. An evaluation may be "complete" if it includes all variables. An evaluation may be a "solution" if it is consistent and complete. Such an evaluation is said to "solve" the constraint satisfaction problem.

Constraint satisfaction problems on finite domains may be solved using a form of search, such as variants of backtracking, constraint propagation, and local search. Some techniques may be combined, as in the very large-scale neighborhood search (VLNS) method.

Constraint optimization problems may optimize an objective function with respect to some variables in the presence of constraints on those variables. The objective function may be a cost function to be minimized, or a reward function to be maximized. Constraints can be either hard constraints, which may set conditions for the variables that are required to be satisfied, or soft constraints, which may include some variable values that may be penalized in the objective function if, and based on the extent that, the conditions on the variables are not satisfied. Solutions to COPs may be found via a variety of algorithms such as, but not limited to, the substitution method, the method of Lagrange multipliers, quadratic programming, branch-and-bound algorithms, first-choice bounding functions, Russian doll search, bucket elimination, and so forth.

Additionally or alternatively, technologies such as linear programming may be employed to solve CSP and/or COPs. Linear programming (also called linear optimization) is a method to achieve a best outcome (e.g., maximum profit, lowest cost, etc.) in a mathematical model whose requirements may be represented by linear relationships. More formally, linear programming may be a technique for the optimization of a linear objective function, subject to linear inequality constraints. Linear programs may be problems that can be expressed as:

Maximize $c^T x$ subject to $Ax \leq b$ and $x \geq 0$ where x represents the vector of variables to be determined, c and b are vectors of known coefficients, A is a known matrix of coefficients, and $(\bullet)^T$ is the matrix transpose.

The expression to be maximized or minimized is called the objective function ($c^T x$ in this case). The inequalities $Ax \leq b$ and $x \geq 0$ may be the constraints which specify a convex polytope over which the objective function is to be optimized. In this context, two vectors are comparable when they have the same dimensions. If every entry in the first is less-than or equal-to the corresponding entry in the second, then it can be said that the first vector is less-than or equal-to the second vector.

A linear solver (e.g., linear solver 210) may solve a CSP, COP, and/or linear programming problem in accordance with any suitable algorithm or method. Examples of suitable algorithms may include, without limitation, a basis exchange algorithm (e.g., a Danzig simplex method algorithm, Bland's rule, Klee-Minty cube, a criss-cross algorithm, the Big M method, etc.), an interior point algorithm (e.g., an ellipsoid algorithm, a projective algorithm (e.g., Karmarkar's algorithm), Mehrotra predictor-corrector method, affine scaling, Vaidya's algorithm, path-following algorithms, etc.), column generation, k-approximation of k-hitting set, and so forth.

Hence, linear solver 210 may solve a CSP, COP, and/or linear programming problem using constraints and optimization objectives defined within policy data 142. For example, policy data 142 may include and/or define a policy that specifies a constraint of equally balancing a utilization (e.g., one or more utilization metrics) of all available data centers 164 while optimizing network latency. An alternate policy may be a "closest data center" policy which may model a closest data center by optimizing edge-to-data-center latency with a constraint of not exceeding predefined utilization thresholds. In some examples, such as when the linear solver may solve a COP, the linear solver may be referred to as a constrained optimization solver.

Additionally or alternatively, generating module 108 may generate routing table 212 by formulating edge-to-data-center routing as an assignment problem that satisfies a service-specific policy. An "assignment problem" may include finding, in a weighted bipartite graph, a matching of a given size, in which the sum of weights of the edges is a minimum.

A formal definition of an assignment problem (or linear assignment problem) may include:

Given two sets, A and T, of equal size, together with a weight function C: A×T→R, find a bisection f:A→T such that the cost function $\Sigma_{a \in A} C$ (a, f (a)) is minimized.

In some examples, the weight function may be viewed as a square real-valued matrix C, so that the cost function may be expressed as $\Sigma_{a \in A} C_{a, f(a)}$.

The complexity of an assignment problem that generating module 108 and/or linear solver 210 may solve to generate routing table 212 may be a function of a number of POP edge nodes 162 and a number of data centers 164, as well as the constraints and optimization objectives. In some examples, generating module 108 and/or linear solver 210 may set soft constraints that may enable linear solver 210 to obtain an approximate solution that may be as optimal as practicable when an exact solution may be difficult to find.

In some examples, generating module 108 may generate routing table 212 for POP edge node 162 by, for each data center in plurality of data centers 164, limiting a change in a volume of traffic routed from a POP edge node to the data center in accordance with a threshold volume difference. For example, as shown in FIG. 2 (and in FIG. 5 described below), computing device 202 may include a safety guard 214. Safety guard 214 may limit a change in a volume of traffic routed from POP edge node 162 to one of data centers 164. Safety guard 214 may use preset limits or thresholds to ensure that every entry in routing table 212 is below a threshold volume difference. This may ensure that no inadvertent spikes in traffic sent to any particular data center 164 occur when POP edge node 162 begins to route data in accordance with routing table 212. Additionally, safety guard 214 may break up larger changes into multiple steps, each published in serial routing table updates so that downstream services (e.g., caching systems) may "warm up" to the larger changes over time.

In some examples, one or more of modules 102 (e.g., generating module 108) may determine a threshold volume difference (e.g., for safety guard 214) by executing a sensitivity analysis. During such a sensitivity analysis, increasing amounts of load may be shifted to a set of services. One or more of modules 102 (e.g., generating module 108) may monitor (e.g., via monitoring infrastructure 150) various characteristics of backend systems such as throughput, latency, and cache efficiency. One or more of modules 102 (e.g., generating module 108) may run this sensitivity analysis in any suitable way and with any suitable periodicity. In some examples, generating module 108 may continually run the sensitivity analysis to tune the threshold volume difference.

In some examples, one or more of the systems described herein may direct a POP edge node to receive a user request from a user device, and may direct the POP edge node to route, in accordance with a routing table, the user request from the POP edge node to a data center in the plurality of data centers. For example, directing module 110 may, as part of computing device 202 in FIG. 2, direct POP edge node 162 to receive a user request from a user device. Directing module 110 may also, as part of computing device 202 in FIG. 2, direct POP edge node to route, in accordance with routing table 212, the user request from POP edge node 162 to one of the data centers included in plurality of data centers 164 (e.g., data center 164-1, data center 164-2, etc.).

Figure 4:
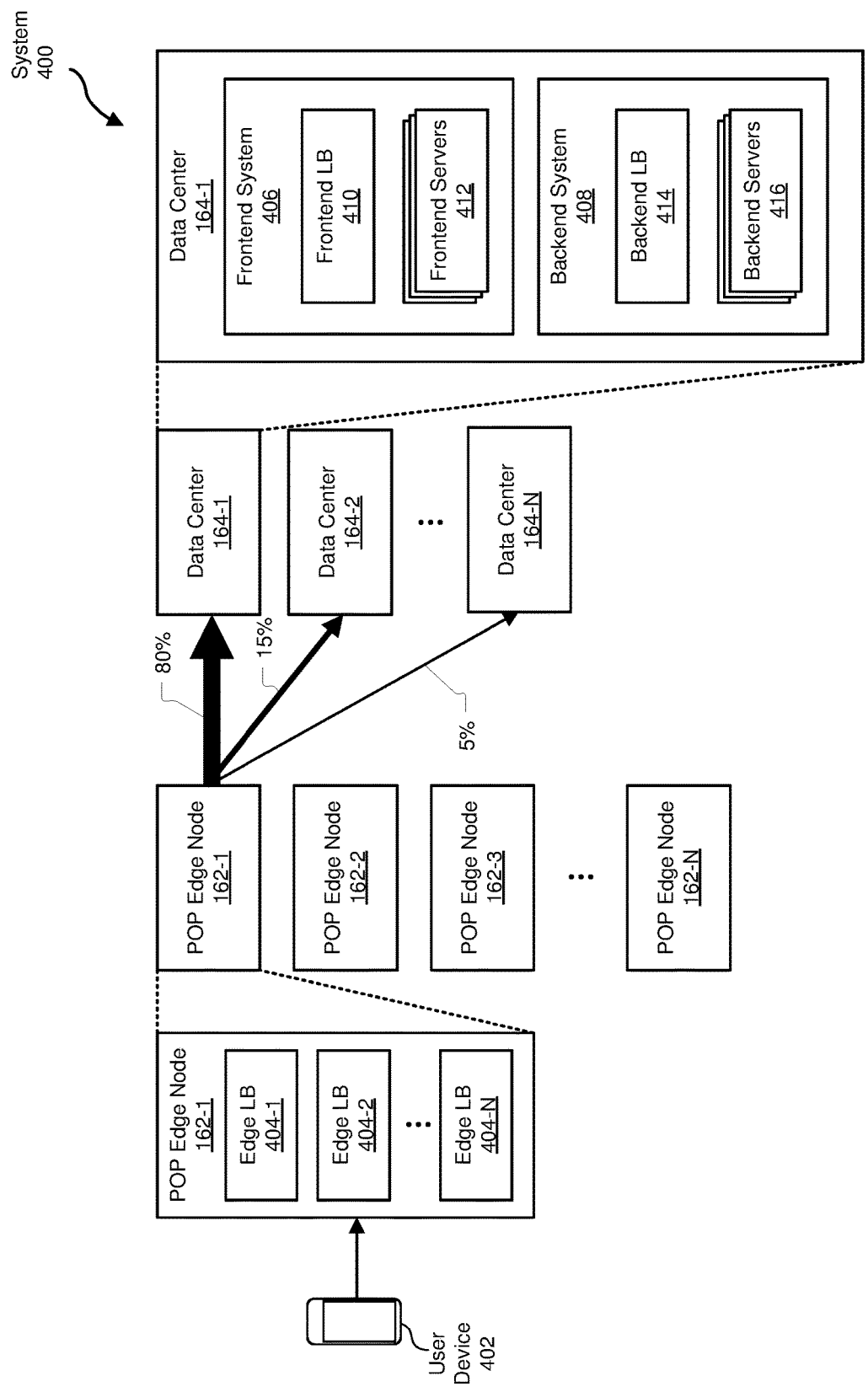
FIGS. 4-5 are block diagrams of example large-scale networking infrastructures that may include example systems for dynamically generating a routing table for an edge node in a large-scale networking infrastructure in accordance with some embodiments described herein.

By way of illustration, FIG. 4 shows an example system 400 that may include a user device 402, as well as a plurality of POP edge nodes 162 (e.g., POP edge node 162-1, POP edge node 162-2, POP edge node 162-3, . . . POP edge node 162-N, etc.) and a plurality of data centers 164 (e.g., data center 164-1, data center 164-2, data center 164-N). As shown, user device 402 may be in communication with at least one POP edge node 162 (e.g., POP edge node 162-1), and each POP edge node 162 may be in communication with each data center 164 (e.g., data center 164-1, data center 164-2, data center 164-N, etc.).

Each POP edge node 162 may include at least one edge load balancer (also "Edge LB" herein). In some examples, a "load balancer" may include any hardware or software system that may distribute workloads (e.g., user requests, responses to user requests, data traffic, etc.) across multiple computing resources, such as computers, computer clusters, network links, central processing units, disk drives, and so forth. In the example shown in FIG. 4, edge LBs 404 may distribute any suitable workload received by POP edge node 162-1 across one or more data centers 164. As shown, POP edge node 162-1 may route 80 percent of a workload (e.g., requests received from user device 402 and/or any other source) to data center 164-1, fifteen percent to data center 164-2, and five percent to data center 164-N.

As further shown in FIG. 4, each data center 164 (e.g., data center 164-1, data center 164-2, data center 164-N, etc.) may further include a frontend system 406 and a backend system 408. Frontend system 406 may include any hardware or software system that may provide a frontend of a service. A "frontend" or "frontend of a service" may include any part of a service (e.g., a web service) that may be associated with a presentation layer of the service. For example, a frontend of a service may provide one or more user interfaces that a user may interact with when using the service. Frontend system 406 may further include at least one frontend load balancer 410 (also "frontend LB" herein) that may distribute workloads associated with a frontend of a service across multiple frontend servers 412. Frontend servers 412 may provide any suitable resources associated with a frontend of a service.

Likewise, backend system 408 may include any hardware or software system that may provide a backend of a service. A "backend" or "backend of a service" may include any part of a service (e.g., a web service) that may be associated with a data access layer of the service. For example, a backend of a service may provide logic and/or data storage associated with the service. Backend system 408 may further include at least one backend load balancer 414 (also "backend LB" herein) that may distribute workloads associated with a backend of a service across multiple backend servers 416. Backend servers 416 may provide any suitable resources associated with a backend of a service.

As an illustration, a user of user device 402 may submit a user request to POP edge node 162-1 via user device 402. POP edge node 162-1 may receive the user request. At least one edge load balancer 404 (e.g., edge load balancer 404-1) may route the user request to one of data centers 164, such as data center 164-1. Depending on whether the user request is for a frontend resource of a service or a backend resource of the service, frontend load balancer 410 may receive the user request and may route the user request to one of frontend servers 412 or backend load balancer 414 may receive the user request and may route the user request to one of backend servers 416. Data center 164-1 may then send a response to the user request back to user device 402 via a similar—though possibly reversed—path.

Figure 5:
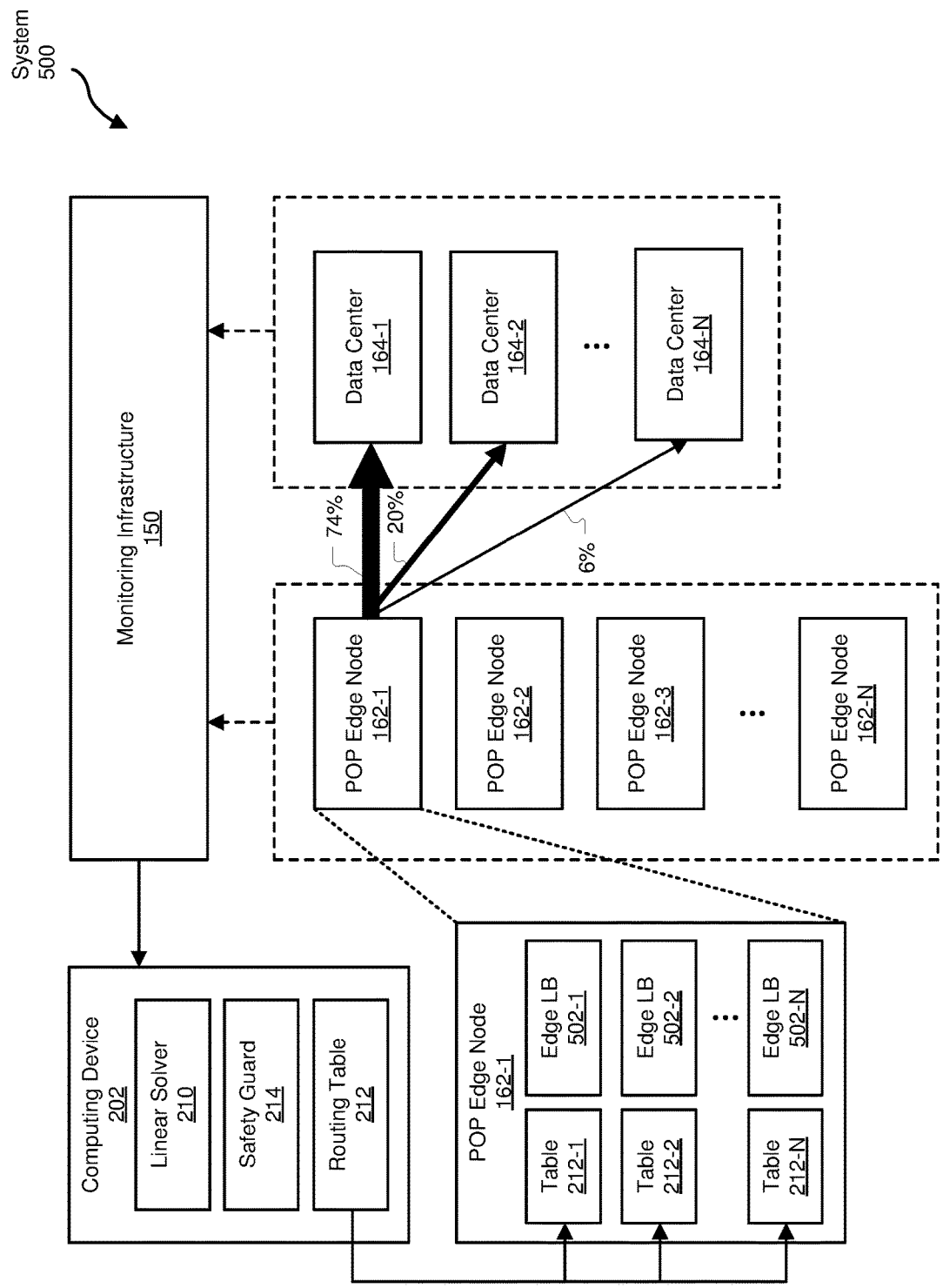

FIG. 5 may show an example system 500 that may include various components included and/or shown in FIGS. 1, 2, and 4. As shown, example system 500 may include monitoring infrastructure 150 that is configured to monitor an operational state of POP edge nodes 162 (e.g., POP edge node 162-1, POP edge node 162-2, POP edge node 162-3, . . . POP edge node 162-N) and data centers 164 (e.g., data center 164-1, data center 164-2, . . . data center 164-N). POP edge node 162-1 may include a plurality of edge load balancers 502 (e.g., edge LB 502-1, edge LB 502-2, . . . edge LB 502-N) that may each include and/or be associated with a routing table 212 (e.g., routing table 212-1, routing table 212-2, . . . routing table 212-N).

As illustrated in FIG. 5 and described in additional detail above, receiving module 104 may, as part of computing device 202, receive, via monitoring infrastructure 150, state data 206 that may include data representative of the operational state of networking infrastructure 160 (e.g., one or more of POP edge nodes 162 and/or one or more of data centers 164) during a period of time. Additionally, accessing module 106 may, as part of computing device 202, access (e.g., from data store 140) policy data 142 that may include and/or be representative of a set of predefined policies associated with networking infrastructure 160.

Furthermore, generating module 108 may, as part of computing device 202 and based on state data 206, determine set of data center load factors 208. Each data center load factor included in set of data center load factors 208 may be associated with a different data center included in data centers 164 (e.g., data center 164-1, data center 164-2, . . . data center 164-N).

Moreover, generating module 108 may, as part of computing device 202, generate routing table 212 for POP edge node 162. As described above, generating module 108 may generate routing table 212 via linear solver 210 and based on state data 206, data center load factors 208, and policy data 142. In some examples, generating module 108 may further generate routing table 212 by limiting, via safety guard 214, a change in a volume of traffic routed from the POP edge node to the data center (e.g., based on and/or in accordance with a threshold volume difference).

As also shown in FIG. 5, in some examples, generating module 108 may generate routing tables for each edge load balancer 502 included in a POP edge node 162 (e.g., POP edge node 162-1). In some examples, generating module 108 may generate a different routing table for each edge load balancer 502 included in a POP edge node. In additional examples, generating module 108 may generate a single routing table 212 for each POP edge node 162 regardless of a number of edge load balancers 502 included in the POP edge node 162. One or more of modules 102 (e.g., generating module 108) may make the routing table or routing tables (e.g., routing table 212-1, routing table 212-2, . . . routing table 212-N) accessible to POP edge node 162, such as by loading the routing table or routing tables into the POP edge node 162.

As shown in FIG. 5, routing table(s) 212 may cause or direct POP edge node 162-1 to route 74 percent of a workload (e.g., requests received from user device 402 and/or any other source) to data center 164-1, twenty percent to data center 164-2, and six percent to data center 164-N. Hence, directing module 110 may direct POP edge node 162-1 to receive a user request from a user device such as user device 402. Directing module 110 may also direct POP edge node 162-1 to route, in accordance with routing table 212-1, the user request from POP edge node 162-2 to one of data centers 164 (e.g., data center 164-1, data center 164-2, or data center 164-N) in accordance with routing table 212-1.

As discussed throughout the instant disclosure, the disclosed systems and methods may provide one or more advantages over traditional options for generating routing tables for edge nodes in large-scale networking infrastructures. For example, embodiments of the systems and methods described herein may model edge-to-data-center traffic routing as an assignment problem, assigning traffic objects at the edge to data centers to satisfy service level objectives. By modeling traffic routing in this way, embodiments may employ constraint optimization solvers to efficiently determine beneficial routing paths for user traffic within the networking infrastructure. Furthermore, embodiments of the systems and methods described herein may continuously adjust a routing table of a POP edge node to accommodate dynamics of user traffic and failure events that may reduce capacity within the networking infrastructure.

EXAMPLE EMBODIMENTS

Example 1: A computer-implemented method comprising (1) receiving, via a monitoring infrastructure that monitors an operational state of a networking infrastructure, data representative of the operational state of the networking infrastructure during a period of time, the networking infrastructure comprising (a) a plurality of data centers, and (b) at least one point-of-presence (POP) edge node, (2) accessing data representative of a set of predefined policies associated with the networking infrastructure, (3) based on the data representative of the operational state of the networking infrastructure during the period of time (a) determining a set of data center load factors, each data center load factor in the set of data center load factors associated with a different data center in the plurality of data centers, and (b) generating, via a linear solver and further based the set of data center load factors and the set of predefined policies associated with the networking infrastructure, a routing table for the POP edge node.

Example 2: The computer-implemented method of example 1, wherein the data representative of the operational state of the networking infrastructure comprises data representative of at least one of (1) a traffic load metric associated with a portion of the networking infrastructure, (2) a capacity metric associated with the portion of the networking infrastructure, (3) a health metric associated with the portion of the networking infrastructure, or (4) a utilization metric associated with the portion of the networking infrastructure.

Example 3: The computer-implemented method of any of examples 1-2, wherein the data representative of the operational state of the networking infrastructure comprises at least one of (1) a set of edge traffic volume metrics, wherein each edge traffic volume metric included in the set of edge traffic volume metrics is associated with a different data center in the plurality of data centers, or (2) a set of latency metrics, wherein each latency metric included in the set of latency metrics is representative of a latency between the POP edge node and a different data center in the plurality of data centers.

Example 4: The computer-implemented method of any of examples 1-3, wherein determining the set of data center load factors comprises modeling, based on the data representative of an operational state of a networking infrastructure, a traffic load of a portion of the networking infrastructure.

Example 5: The computer-implemented method of example 4, wherein modeling the traffic load of the portion of the networking infrastructure comprises modeling stateless traffic as requests-per-second and sticky traffic as user sessions.

Example 6: The computer-implemented method of any of examples 1-5, wherein (1) the linear solver comprises a constrained optimization solver, (2) the data representative of the set of predefined policies associated with the networking infrastructure comprises data representative of a policy that specifies a constraint and an optimization objective, and (3) generating the routing table for the POP edge node comprises assigning, via the constrained optimization solver and based on the constraint and the optimization objective, for each data center in the plurality of data centers, a respective fraction of traffic for the POP edge node to route to the data center.

Example 7: The computer-implemented method of example 6, wherein (1) the constraint comprises equally balancing, for each data center in the plurality of data centers, a utilization metric associated with the data center, and (2) the optimization objective comprises optimizing a network latency metric associated with the networking infrastructure.

Example 8: The computer-implemented method of any of examples 6-7, wherein (1) the constraint comprises, for each data center in the plurality of data centers, a predefined utilization threshold associated with the data center, and (2) the optimization objective comprises, for each data center in the plurality of data centers, optimizing a latency metric associated with the POP edge node and the data center.

Example 9: The computer-implemented method of any of examples 1-8, wherein generating the routing table for the POP edge node comprises, for each data center in the plurality of data centers, limiting a change in a volume of traffic routed from the POP edge node to the data center in accordance with a threshold volume difference.

Example 10: The computer-implemented method of any of examples 1-9, further comprising (1) receiving, via the POP edge node, a user request from a user device, and (2) routing, in accordance with the routing table, the user request from the POP edge node to a data center in the plurality of data centers.

Example 11: The computer-implemented method of any of examples 1-10, wherein the routing table comprises data representative of a fraction of user traffic received by the POP edge node that the POP edge node routes to a data center included in the plurality of data centers.

Example 12: A system comprising (1) a networking infrastructure comprising (a) a plurality of data centers, and (b) at least one point-of-presence (POP) edge node, (2) a monitoring infrastructure that monitors an operational state of the networking infrastructure, (3) a receiving module, stored in memory, that receives, via the monitoring infrastructure, data representative of the operational state of the networking infrastructure during a period of time, (4) an accessing module, stored in memory, that accesses data representative of a policy associated with the networking infrastructure, and (5) a generating module, stored in memory, that, based on the data representative of the operational state of the networking infrastructure during the period of time (a) determines a set of data center load factors, each data center load factor in the set of data center load factors associated with a different data center in the plurality of data centers, and (b) generates, via a linear solver and further based on the set of data center data center load factors and the policy associated with the networking infrastructure, a routing table for the POP edge node.

Example 13: The system of example 12, wherein the generating module determines the set of data center load factors by modeling, based on the data representative of an operational state of a networking infrastructure, a traffic load of a portion of the networking infrastructure.

Example 14: The system of example 13, wherein the generating module models the traffic load of the portion of the networking infrastructure by modeling stateless traffic as requests per second (RPS) and sticky traffic as user sessions.

Example 15: The system of any of examples 12-14, wherein (1) the linear solver comprises a constrained optimization solver, (2) the data representative of the policy associated with the networking infrastructure comprises data representative of a policy that specifies a constraint and an optimization objective, and (3) the generating module generates the routing table for the POP edge node by assigning, via the constrained optimization solver and based on the constraint and the optimization objective, for each data center in the plurality of data centers, a respective fraction of traffic for the POP edge node to route to the data center.

Example 16: The system of any of examples 12-15, wherein the generating module generates the routing table for the POP edge node by, for each data center in the plurality of data centers, limiting a change in a volume of traffic routed from the POP edge node to the data center in accordance with a threshold volume difference.

Example 17: The system of any of examples 12-16, wherein the routing table comprises data representative of a fraction of user traffic received by the POP edge node that the POP edge node routes to a data center included in the plurality of data centers.

Example 18: The system of any of examples 12-17, wherein the data representative of the operational state of the networking infrastructure comprises at least one of (1) a set of edge traffic volume metrics, wherein each edge traffic volume metric included in the set of edge traffic volume metrics is associated with a different data center in the plurality of data centers, or (2) a set of latency metrics, wherein each latency metric included in the set of latency metrics is representative of a latency between the POP edge node and a different data center in the plurality of data centers.

Example 19: The system of any of examples 12-18, further comprising a directing module, stored in memory, that directs the POP edge node to (1) receive a user request from a user device, and (2) route, in accordance with the routing table, the user request from the POP edge node to a data center in the plurality of data centers.

Example 20: A non-transitory computer-readable medium comprising computer-readable instructions that, when executed by at least one processor of a computing system, cause the computing system to (1) receive, via a monitoring infrastructure that monitors an operational state of a networking infrastructure, data representative of the operational state of the networking infrastructure during a period of time, the networking infrastructure comprising (a) a plurality of data centers, and (b) at least one point-of-presence (POP) edge node, (2) access data representative of a set of predefined policies associated with the networking infrastructure, (3) based on the data representative of the operational state of the networking infrastructure during the period of time (a) determine a set of data center load factors, each data center load factor in the set of data center load factors associated with a different data center in the plurality of data center, and (b) generate, via a linear solver and further based the set of data center load factors and the set of predefined policies associated with the networking infrastructure, a routing table for the POP edge node.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive operational state data to be transformed, transform the operational state data, output a result of the transformation to generate a routing table, use the result of the transformation to route data within a networking infrastructure, and store the result of the transformation to generate additional routing tables. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" and/or "non-transitory computer-readable medium" may generally refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   receiving, via a monitoring infrastructure that monitors an operational state of a networking infrastructure, data representative of the operational state of the networking infrastructure during a period of time, the networking infrastructure comprising:
   a plurality of data centers; and
   at least one point-of-presence (POP) edge node;
   accessing data representative of a set of predefined policies associated with the networking infrastructure;
   based on the data representative of the operational state of the networking infrastructure during the period of time:
   determining a set of data center load factors, each data center load factor in the set of data center load factors associated with a different data center in the plurality of data centers; and
   generating, via a linear solver and further based the set of data center load factors and the set of predefined policies associated with the networking infrastructure, a routing table for the POP edge node.

2. The computer-implemented method of claim 1, wherein the data representative of the operational state of the networking infrastructure comprises data representative of at least one of:
   a traffic load metric associated with a portion of the networking infrastructure;
   a capacity metric associated with the portion of the networking infrastructure;
   a health metric associated with the portion of the networking infrastructure; or
   a utilization metric associated with the portion of the networking infrastructure.

3. The computer-implemented method of claim 1, wherein the data representative of the operational state of the networking infrastructure comprises at least one of:
   a set of edge traffic volume metrics, wherein each edge traffic volume metric included in the set of edge traffic volume metrics is associated with a different data center in the plurality of data centers; or
   a set of latency metrics, wherein each latency metric included in the set of latency metrics is representative of a latency between the POP edge node and a different data center in the plurality of data centers.

4. The computer-implemented method of claim 1, wherein determining the set of data center load factors comprises modeling, based on the data representative of an operational state of a networking infrastructure, a traffic load of a portion of the networking infrastructure.

5. The computer-implemented method of claim 4, wherein modeling the traffic load of the portion of the networking infrastructure comprises modeling stateless traffic as requests-per-second and sticky traffic as user sessions.

6. The computer-implemented method of claim 1, wherein:
the linear solver comprises a constrained optimization solver;
the data representative of the set of predefined policies associated with the networking infrastructure comprises data representative of a policy that specifies a constraint and an optimization objective; and
generating the routing table for the POP edge node comprises assigning, via the constrained optimization solver and based on the constraint and the optimization objective, for each data center in the plurality of data centers, a respective fraction of traffic for the POP edge node to route to the data center.

7. The computer-implemented method of claim 6, wherein:
the constraint comprises equally balancing, for each data center in the plurality of data centers, a utilization metric associated with the data center; and
the optimization objective comprises optimizing a network latency metric associated with the networking infrastructure.

8. The computer-implemented method of claim 6, wherein:
the constraint comprises, for each data center in the plurality of data centers, a predefined utilization threshold associated with the data center; and
the optimization objective comprises, for each data center in the plurality of data centers, optimizing a latency metric associated with the POP edge node and the data center.

9. The computer-implemented method of claim 1, wherein generating the routing table for the POP edge node comprises, for each data center in the plurality of data centers, limiting a change in a volume of traffic routed from the POP edge node to the data center in accordance with a threshold volume difference.

10. The computer-implemented method of claim 1, further comprising:
receiving, via the POP edge node, a user request from a user device; and
routing, in accordance with the routing table, the user request from the POP edge node to a data center in the plurality of data centers.

11. The computer-implemented method of claim 1, wherein the routing table comprises data representative of a fraction of user traffic received by the POP edge node that the POP edge node routes to a data center included in the plurality of data centers.

12. A system comprising:
a networking infrastructure comprising:
a plurality of data centers; and
at least one point-of-presence (POP) edge node;
a monitoring infrastructure that monitors an operational state of the networking infrastructure;
a receiving module, stored in memory, that receives, via the monitoring infrastructure, data representative of the operational state of the networking infrastructure during a period of time;
an accessing module, stored in memory, that accesses data representative of a policy associated with the networking infrastructure;
a generating module, stored in memory, that, based on the data representative of the operational state of the networking infrastructure during the period of time:
determines a set of data center load factors, each data center load factor in the set of data center load factors associated with a different data center in the plurality of data centers; and
generates, via a linear solver and further based on the set of data center load factors and the policy associated with the networking infrastructure, a routing table for the POP edge node; and
at least one physical processor that executes the receiving module, the accessing module, and the generating module.

13. The system of claim 12, wherein the generating module determines the set of data center load factors by modeling, based on the data representative of an operational state of a networking infrastructure, a traffic load of a portion of the networking infrastructure.

14. The system of claim 13, wherein the generating module models the traffic load of the portion of the networking infrastructure by modeling stateless traffic as requests per second (RPS) and sticky traffic as user sessions.

15. The system of claim 12, wherein:
the linear solver comprises a constrained optimization solver;
the data representative of the policy associated with the networking infrastructure comprises data representative of a policy that specifies a constraint and an optimization objective; and
the generating module generates the routing table for the POP edge node by assigning, via the constrained optimization solver and based on the constraint and the optimization objective, for each data center in the plurality of data centers, a respective fraction of traffic for the POP edge node to route to the data center.

16. The system of claim 12, wherein the generating module generates the routing table for the POP edge node by, for each data center in the plurality of data centers, limiting a change in a volume of traffic routed from the POP edge node to the data center in accordance with a threshold volume difference.

17. The system of claim 12, wherein the routing table comprises data representative of a fraction of user traffic received by the POP edge node that the POP edge node routes to a data center included in the plurality of data centers.

18. The system of claim 12, wherein the data representative of the operational state of the networking infrastructure comprises at least one of:
a set of edge traffic volume metrics, wherein each edge traffic volume metric included in the set of edge traffic volume metrics is associated with a different data center in the plurality of data centers; or
a set of latency metrics, wherein each latency metric included in the set of latency metrics is representative of a latency between the POP edge node and a different data center in the plurality of data centers.

19. The system of claim 12, further comprising a directing module, stored in memory, that directs the POP edge node to:
receive a user request from a user device; and
route, in accordance with the routing table, the user request from the POP edge node to a data center in the plurality of data centers.

20. A non-transitory computer-readable medium comprising computer-readable instructions that, when executed by at least one processor of a computing system, cause the computing system to:

receive, via a monitoring infrastructure that monitors an operational state of a networking infrastructure, data representative of the operational state of the networking infrastructure during a period of time, the networking infrastructure comprising:
   a plurality of data centers; and
   at least one point-of-presence (POP) edge node;
access data representative of a set of predefined policies associated with the networking infrastructure;
based on the data representative of the operational state of the networking infrastructure during the period of time:
   determine a set of data center load factors, each data center load factor in the set of data center load factors associated with a different data center in the plurality of data center; and
   generate, via a linear solver and further based the set of data center load factors and the set of predefined policies associated with the networking infrastructure, a routing table for the POP edge node.

\* \* \* \* \*